US011474568B2

(12) United States Patent
Singh et al.

(10) Patent No.: US 11,474,568 B2
(45) Date of Patent: *Oct. 18, 2022

(54) OFFSET HINGE ASSEMBLY FOR MOBILE COMPUTE DEVICES

(71) Applicant: Intel Corporation, Santa Clara, CA (US)

(72) Inventors: Bijendra Singh, Bangalore (IN); Prakash Kurma Raju, Bangalore (IN); Prasanna Pichumani, Bangalore (IN); Kathiravan D, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/227,962

(22) Filed: Apr. 12, 2021

(65) Prior Publication Data

US 2021/0232184 A1    Jul. 29, 2021

Related U.S. Application Data

(63) Continuation of application No. 16/274,818, filed on Feb. 13, 2019, now Pat. No. 10,976,782.

(30) Foreign Application Priority Data

Dec. 21, 2018   (IN) .............................. 201841048649

(51) Int. Cl.
*G06F 1/16*   (2006.01)
(52) U.S. Cl.
CPC .......... *G06F 1/1681* (2013.01); *G06F 1/1618* (2013.01); *G06F 1/1643* (2013.01)

(58) Field of Classification Search
CPC ..... G06F 1/1681; G06F 1/1618; G06F 1/1643
See application file for complete search history.

(56) References Cited

U.S. PATENT DOCUMENTS

| 7,336,480 B2 * | 2/2008 | Kwon ................... G06F 1/1618 |
| | | 455/575.1 |
| 8,208,249 B2 * | 6/2012 | Chin .................... G06F 1/1618 |
| | | 361/679.55 |

(Continued)

OTHER PUBLICATIONS

United States Patent and Trademark Office, "Non-Final Office Action," issued in connection with U.S. Appl. No. 16/274,818, dated Jan. 2, 2020, 22 pages.

(Continued)

*Primary Examiner* — Abhishek M Rathod
*Assistant Examiner* — Keith DePew
(74) *Attorney, Agent, or Firm* — Hanley, Flight & Zimmerman, LLC

(57) ABSTRACT

A convertible mobile compute device comprises a lid, a base, and a hinge assembly coupled to the lid and the base. The hinge assembly includes a lid hinge bracket secured to the lid and configured to rotate about a lid hinge axis. The hinge assembly also includes a base hinge bracket secured to the base and configured to rotate about a base hinge axis. The lid hinge axis is offset from a centerline axis defined by the lid, and the base hinge axis is offset from a centerline axis defined by the base. As described herein, the offsetting of the hinge axes provides for a smaller a lid-to-base gap when the convertible mobile compute device is positioned in a closed mode relative to when the convertible mobile compute device is positioned in a tablet mode.

18 Claims, 7 Drawing Sheets

(56) References Cited

U.S. PATENT DOCUMENTS

| | | | |
|---|---|---|---|
| 9,360,896 B2* | 6/2016 | Lim | G06F 1/1616 |
| 9,411,365 B1* | 8/2016 | Tanner | G06F 1/1681 |
| 9,507,388 B1* | 11/2016 | Hampton | G06F 1/1681 |
| 9,563,236 B2* | 2/2017 | Rittenhouse | G06F 1/1618 |
| 9,625,950 B1* | 4/2017 | Moore | G06F 1/1643 |
| 9,658,652 B2* | 5/2017 | McClintock | G06F 1/1681 |
| 9,785,188 B1* | 10/2017 | Schwager | G06F 1/1654 |
| 9,983,627 B1* | 5/2018 | Pelissier | G06F 1/1681 |
| 10,024,092 B1* | 7/2018 | Tanner | G06F 1/1683 |
| 10,180,701 B2* | 1/2019 | Nakamura | G06F 1/1643 |
| 10,227,808 B2* | 3/2019 | Siddiqui | G06F 1/1641 |
| 10,344,510 B2* | 7/2019 | Siddiqui | G06F 1/1618 |
| 10,364,598 B2* | 7/2019 | Tazbaz | E05D 11/1064 |
| 10,474,203 B2* | 11/2019 | Tazbaz | G06F 1/1616 |
| 11,336,067 B2* | 5/2022 | Liu | H01R 35/02 |
| 2006/0126281 A1* | 6/2006 | Kwon | G06F 1/1679 361/679.17 |
| 2009/0000062 A1* | 1/2009 | Yamanami | G06F 1/1681 16/366 |
| 2011/0099756 A1* | 5/2011 | Chen | G06F 1/1618 16/297 |
| 2013/0135809 A1* | 5/2013 | Uchiyama | G06F 1/1618 16/371 |
| 2013/0318746 A1* | 12/2013 | Kuramochi | G06F 1/1681 16/371 |
| 2015/0052707 A1* | 2/2015 | Lin | E05D 3/06 16/366 |
| 2015/0160695 A1* | 6/2015 | Su | G06F 1/1681 16/366 |
| 2015/0277505 A1* | 10/2015 | Lim | G06F 1/1618 16/366 |
| 2016/0010375 A1* | 1/2016 | Rittenhouse | G06F 1/1681 16/338 |
| 2016/0123054 A1* | 5/2016 | Senatori | G06F 1/1681 16/359 |
| 2017/0117608 A1* | 4/2017 | Bologna | H01Q 21/30 |
| 2017/0185104 A1* | 6/2017 | Krivoy | G06F 1/1618 |
| 2017/0269638 A1* | 9/2017 | Chen | E05D 13/14 |
| 2018/0024589 A1* | 1/2018 | Nakamura | G06F 1/1643 361/679.09 |
| 2018/0246546 A1* | 8/2018 | Ghosh | H01R 35/02 |
| 2018/0254540 A1* | 9/2018 | Yoo | H01Q 1/243 |
| 2019/0035324 A1* | 1/2019 | Aurongzeb | G06F 1/1652 |
| 2019/0086970 A1* | 3/2019 | Fang | G06F 1/1681 |
| 2019/0155344 A1* | 5/2019 | Lin | G06F 1/1681 |
| 2019/0163240 A1* | 5/2019 | Lin | G06F 1/1618 |
| 2019/0163241 A1* | 5/2019 | Moon | G06F 1/1641 |
| 2019/0179377 A1 | 6/2019 | Singh et al. | |

OTHER PUBLICATIONS

United States Patent and Trademark Office, "Final Office Action," issued in connection with U.S. Appl. No. 16/274,818, dated Aug. 31, 2020, 20 pages.

United States Patent and Trademark Office, "Notice of Allowance and Fee(s) Due," issued in connection with U.S. Appl. No. 16/274,818, dated Nov. 30, 2020, 10 pages.

* cited by examiner

OFFSET HINGE ASSEMBLY FOR MOBILE COMPUTE DEVICES

CROSS-REFERENCE TO RELATED APPLICATIONS

This patent arises from a continuation of U.S. application Ser. No. 16/274,818 (now U.S. Pat. No. 10,976,782), titled "Offset Hinge Assembly for Mobile Compute Devices," Feb. 13, 2019, which claims priority to Indian Provisional Patent Application No. 2018/41048649, filed on Dec. 21, 2018. U.S. application Ser. No. 16/274,818 and Indian Provisional Patent Application No. 2018/41048649 are hereby incorporated by reference in their entireties.

BACKGROUND

Mobile compute devices come in a variety of forms, including cell phones, laptops, and tablets. Some mobile compute devices may fit into multiple categories, such as a laptop with a display that can be folded 360 degrees and convert from a clamshell-mode configuration to a tablet-mode configuration. Typically, thinner designs of mobile compute devices are more desirable by consumers. However, designing a mobile compute device to be thinner often incurs an adverse impact on its thermal performance.

Many convertible mobile compute devices, such as laptops configured to convert from a clamshell-mode configuration to a tablet-mode configuration include a lid, in which the display is typically mounted, and a base, in which the keyboard is typically mounted. To ensure proper thermal performance, typical convertible mobile compute devices are designed such that the lid-to-base bush height (i.e., the spacing between the lid and the base) is the same in both laptop and tablet modes. However, such a requirement leads to thicker designs.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
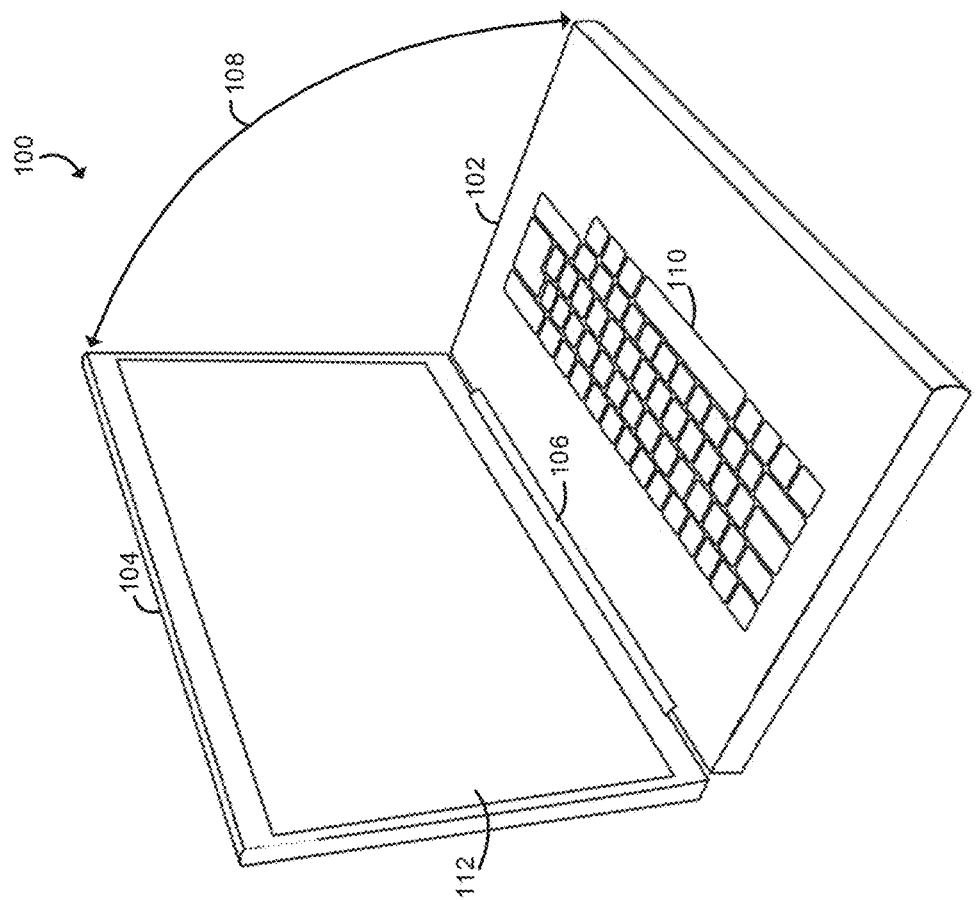
FIG. 1 is a simplified perspective view of at least one embodiment of a convertible mobile compute device positioned in a laptop mode.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative convertible mobile compute device 100 includes a base 102 and a lid 104 coupled together via a hinge assembly 106. The base 102 illustratively includes a keyboard 110, and the lid 104 illustratively includes a display 112. The keyboard 110 may be embodied as any type of keyboard such as a physical or virtual (e.g., touchscreen) keyboard and includes a number of keys selectable by a user to provide input to the convertible mobile compute device 100. Similarly, the display 112 may be embodied as any type of display capable of displaying information to a user of the convertible mobile compute device 100 such as a light emitting diode (LED) display, a touchscreen display, liquid crystal display (LCD), or other display. Of course, it should be appreciated that in some embodiments, the convertible mobile compute device 100 may not include the keyboard 110. In such embodiments, the display 112 may include a touchscreen, which may be used as a keyboard during operation of the convertible mobile compute device 100.

The hinge assembly 106 couples the base 102 and lid 104 and is configured to allow movement of the lid 104 relative to the base 102 along a lid-to-base axis 108. In use, as discussed in more detail below, the hinge assembly 106 facilitates the positioning of the convertible mobile compute device 100 into one of multiple physical configuration modes, such as a closed mode, a clamshell mode, a tent mode, and a tablet mode. To do so, a user may move the lid 102 along the lid-to-base axis 108 to achieve the desired physical configuration mode of the convertible mobile compute device 100. As such, the convertible mobile compute device 100 may be embodied as any type of computation or computer device positionable into multiple physical configuration modes (e.g., clamshell mode, tent mode, tablet mode, etc.) and capable of performing the functions described herein, including, without limitation, a convertible laptop computer, a mobile computer, a laptop computer, a tablet computer, a smartphone, a notebook computer, a wearable computing device, a multiprocessor system, a mobile internet device, a telephony device, a consumer electronic device, and/or other portable computing device.

As discussed above, the convertible mobile compute device 100 is adjustable or configurable into one of several different physical configuration modes. For example, the convertible mobile compute device 100 is shown in several illustrative physical configuration modes in FIGS. 2-5. It should be appreciated, however, that some embodiments of the convertible mobile compute device 100 may contain fewer or more physical configuration modes, or alternative modes, than those illustrated herein.

Figure 2:
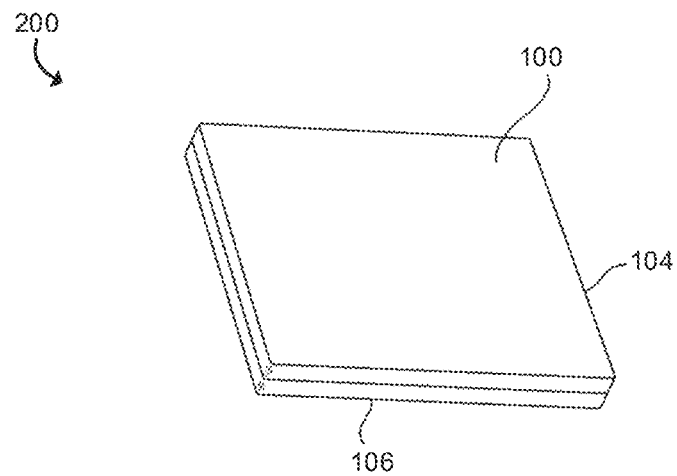
FIG. 2 is a simplified perspective view of the convertible mobile compute device of FIG. 1 in a closed mode.

Referring to FIG. 2, in some embodiments, the convertible mobile compute device 100 may be adjusted or configured into a closed mode 200. As shown, when in the closed mode 200, a user-facing side 304 of the lid 104 (see FIG. 3) abuts or confronts a user-facing side of the base 102 (see FIG. 3). Typically, when the convertible mobile compute device 100 is in the closed mode 200, the convertible mobile compute device 100 is in standby, powered off, or being operated by a user via an external device (not shown), such as a docking station, for example.

Figure 3:
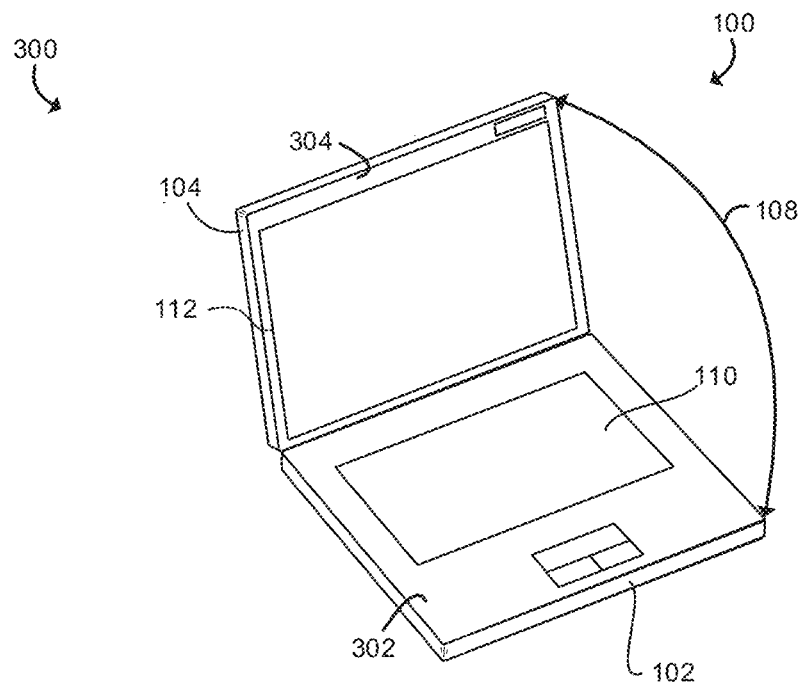
FIG. 3 is a simplified perspective view of the convertible mobile compute device of FIG. 2 positioned in a clamshell mode.

Referring now to FIG. 3, in some embodiments, the convertible mobile compute device 100 may also be adjusted or configured into a clamshell mode 300. As shown, when in the clamshell mode 300, the convertible mobile compute device 100 is opened such that the user-facing side 304 of the lid 104 is rotated away from the user-facing side 302 of the base 102 to allow a user to view each user-facing sides 302, 304 of the convertible mobile compute device 100. In the illustrative embodiment of FIG. 3, the lid-to-base angle 180 defined between the lid 104 and the base 102 is about 90 degrees. However, the convertible mobile compute device 100 may be considered to be configured in the clamshell mode when the lid-to-base angle 180 is greater than a minimum threshold (e.g., greater than zero degrees) and equal to or less than a maximum threshold (e.g., 180 degrees). Of course, in other embodiments, the particular range of lid-to-base angles that define the clamshell mode 300 may vary based on various criteria, such as the design or intended use of the convertible mobile compute device 100.

Figure 4:
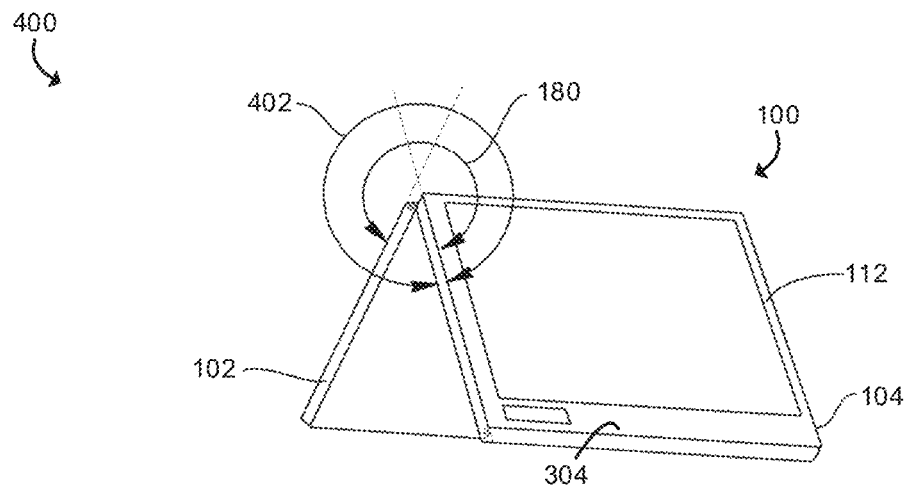
FIG. 4 is a simplified perspective view of the convertible mobile compute device of FIG. 2 positioned in a tent mode.

Referring now to FIG. 4, in some embodiments, the convertible mobile compute device 100 may also be adjusted or configured into a tent mode 400. It should be noted that the convertible mobile compute device 100 has been rotated generally 180° about a vertical axis between FIG. 3 and FIG. 4 to provide clarity of the tent mode 400 embodiment (i.e., the user-facing side 304 of the lid 104 is facing the user). It should further be appreciated that the display 112 may invert when the convertible mobile compute device 100 is placed in the tent mode 400 to provide proper viewing to a user. As shown in FIG. 4, in the tent mode 400, the lid 104 of the convertible mobile compute device 100 has been rotated from the base 102 even further relative to the clamshell mode 300 and generally resembles a tent from a side profile. In the illustrative embodiment of FIG. 4, the lid-to-base angle 180 defined between the lid 104 and the base 102 is about 270 degrees. However, the convertible mobile compute device 100 may be considered to be configured in the tent mode when the lid-to-base angle 180 is greater than a minimum threshold (e.g., greater than 180 degrees) and equal to or less than a maximum threshold (e.g., 360 degrees as shown by angle reference 402). Of course, in other embodiments, the particular range of lid-to-base angles that defines the tent mode 400 may vary based on various criteria, such as the design or intended use of the convertible mobile compute device 100. Additionally, it should be appreciated that the maximum threshold angle of the lid-to-base angle 180 that defines the tent mode 400 may be dependent upon the thickness of the lid 104 and/or base 102 of the convertible mobile compute device 100.

Figure 5:
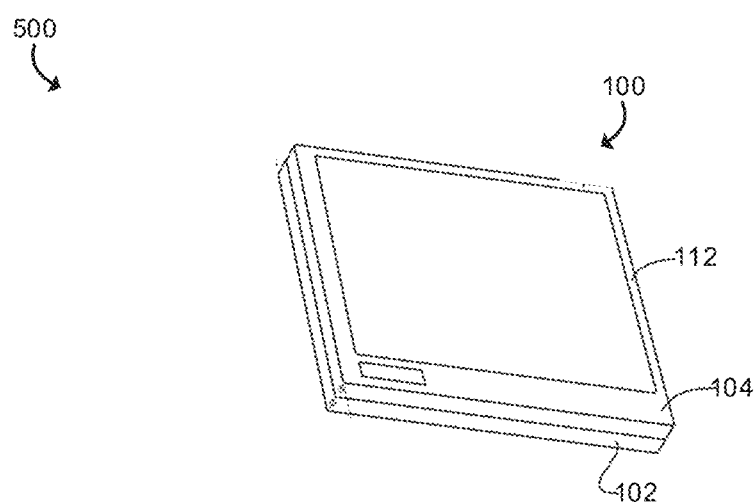
FIG. 5 is a simplified perspective view of the convertible mobile compute device of FIG. 2 positioned in a tablet mode.

Referring now to FIG. 5, in some embodiments, the convertible mobile compute device 100 may also be adjusted or configured into a tablet mode 500. As shown, in the tablet mode 500, the lid 104 of the convertible mobile compute device 100 has been rotated relative to the base 102 such that the lid 104 abuts or confronts the base 102. As such, the convertible mobile compute device 100 generally resembles a tablet computer while in the tablet mode 500. In the illustrative embodiment of FIG. 5, the lid-to-base angle 180 defined by the lid axis 220 and the base axis 222 is about 360 degrees. However, the convertible mobile compute device 100 may be considered to be configured in the tablet mode 500 when the lid-to-base angle 180 is greater than a minimum threshold (e.g., greater than 300 degrees). Of course, the particular minimum lid-to-base angle that defines the tablet mode 500 may be different in other embodiments based on various criteria, such as the design or intended use of the convertible mobile compute device 100. Additionally, it should be appreciated that the minimum threshold angle of the lid-to-base angle 180 that defines the tablet mode 500 may be dependent upon the thickness of the lid 104 and/or base 102 of the convertible mobile compute device 100.

Figure 6:
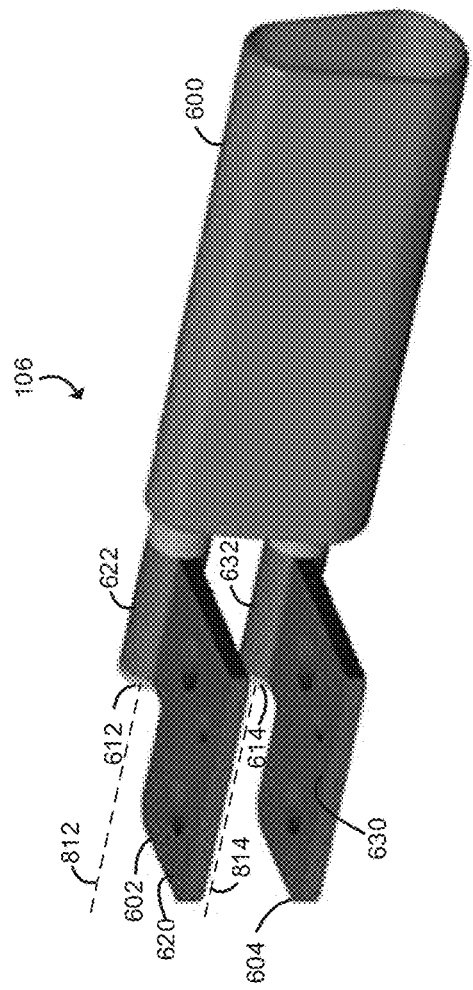
FIG. 6 is a simplified perspective view of at least one embodiment of a hinge assembly of the convertible mobile compute device of FIG. 1.
Figure 7:
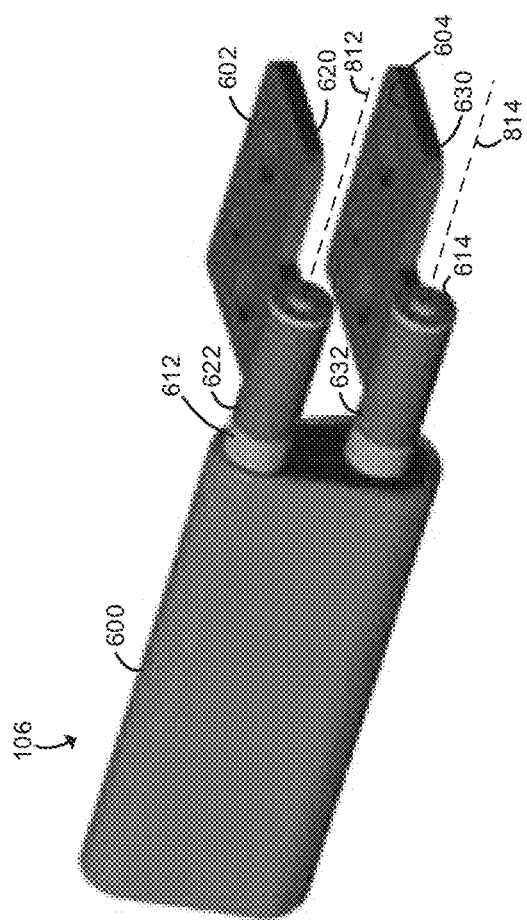
FIG. 7 is another simplified perspective view of at least one embodiment of the hinge assembly of FIG. 6.

Referring now to FIGS. 6 and 7, the illustrative hinge assembly 106 includes a housing 600 from which a lid shaft 612 and a base shaft 614 protrude outwardly on either side of the housing 600 (although only one side is shown in each of FIGS. 6 and 7). A lid hinge bracket 602 is received on the lid shaft 612, and a base hinge bracket 604 is received on the base shaft 614. The lid hinge bracket 602 includes a lid mounting plate 620 and a mounting shaft tube 622. The lid mounting plate 620 is configured to be secured to the lid 104 of the convertible mobile compute device 100 and may include corresponding features, such as apertures, to facilitate such attachment. Similarly, the lid 104 may include a corresponding mounting plate (not shown) configured to mate or couple with the lid mounting plate 620 to secure the hinge assembly 106 to the lid 104. The mounting shaft tube 622 is configured to receive the lid shaft 612 when the lid hinge bracket 602 is coupled to the housing 600 as shown in FIGS. 6 and 7. When so coupled, the lid hinge bracket 602 is configured to rotate about a lid hinge axis 812, defined by the lid shaft 612.

Similar to the lid hinge bracket 602, the base hinge bracket 604 includes a base mounting plate 630 and a mounting shaft tube 632. The base mounting plate 630 is configured to be secured to the base 102 of the convertible mobile compute device 100 and may include corresponding features, such as apertures, to facilitate such attachment. Similarly, the base 106 may include a corresponding mounting plate (not shown) configured to mate or couple with the base mounting plate 630 to secure the hinge assembly 106 to the base 106. The mounting shaft tube 632 is configured to receive the base shaft 642 when the base hinge bracket 604 is coupled to the housing 600 as shown in FIGS. 6 and 7. When so coupled, the base hinge bracket 604 is configured to rotate about a base hinge axis 814, defined by the base shaft 614.

The hinge assembly 600 may include other components, such as those commonly found in a hinge assembly of a mobile compute device (e.g., a laptop). For example, the hinge assembly 106 may include various gears, bushings, and other mechanical devices, such as spur gears and friction bushings, to provide a suitable operational and holding torque such that the lid 104 is capable of maintaining its position relative to the base 102. Additionally, as discussed above, it should be appreciated that the illustrative hinge assembly 106 includes a lid shaft 612, a base shaft 614, a lid hinge bracket 602, and a base hinge bracket 604 on both ends of the housing 600 (i.e., on the left and right sides of the housing 600 as viewed from the position of the operator of the convertible mobile compute device 100.

Figure 8:
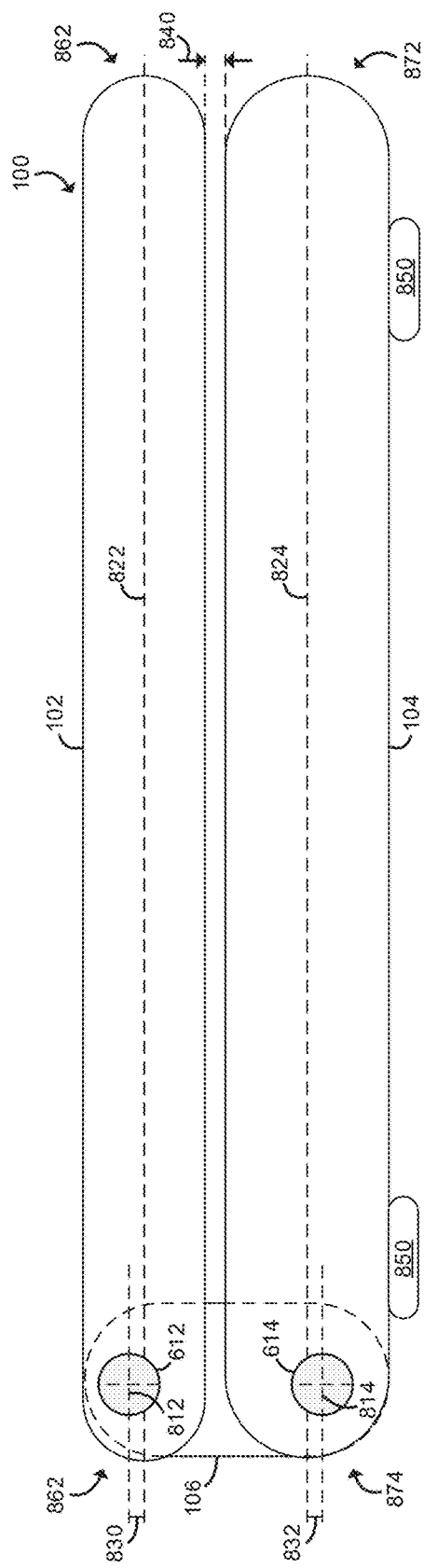
FIG. 8 is a simplified side elevation illustration of the convertible mobile compute device of FIG. 1 in the closed position of FIG. 2.
Figure 9:
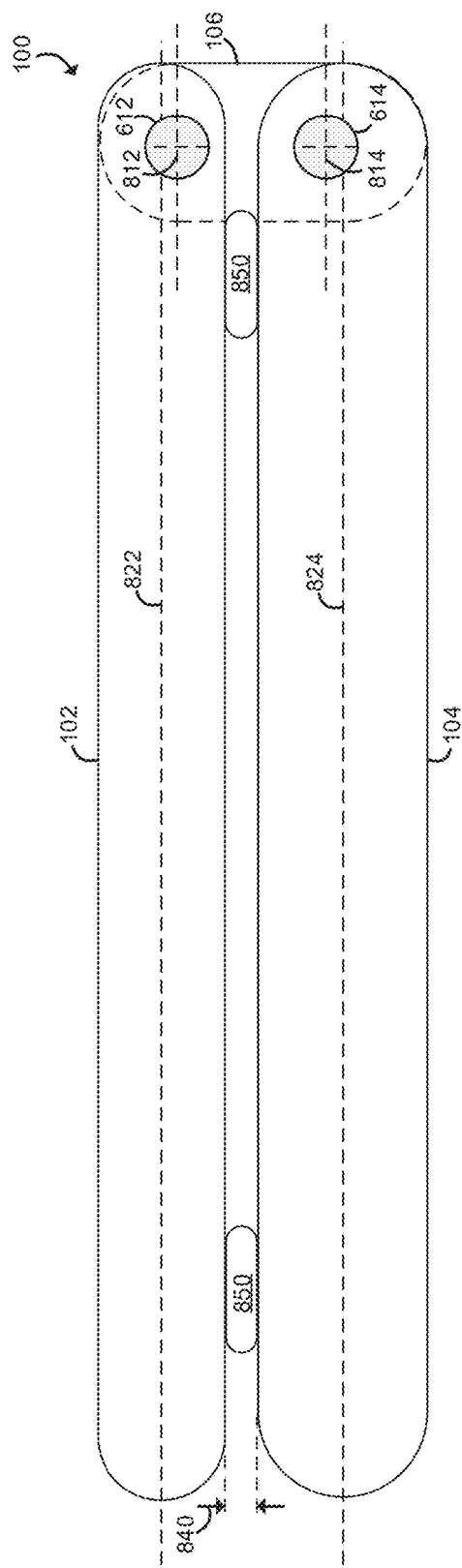
FIG. 9 is a simplified side elevation illustration of the convertible mobile compute device of FIG. 2 in the tablet position of FIG. 5.

Referring now to FIGS. 8 and 9, in the illustrative embodiment, the lid shaft 612 and, as such, the lid hinge axis 812 is offset from a lid centerline axis 822 of the lid 102. Similarly, the base shaft 614 and, as such, the base hinge axis 814 is offset from a base centerline axis 824 of the base 104. The lid centerline axis 822 is defined by the lid 102 and extends longitudinally through the center of the lid 102 along a direction from a front-side 862 to a rear-side 864 of the lid 102. Similarly, the base centerline axis 824 is defined by the base 104 and extends longitudinally through the center of the base 104 along a direction from a front-side 872 to a rear-side 8674 of the lid 102.

As shown in FIG. 8, the lid hinge axis 812 is offset vertically from the lid centerline axis 822 by a distance 830, and the base hinge axis 814 is offset vertically from the bae centerline axis 814 by a distance of 832. Each of the axes 812, 814 are offset relative to the corresponding centerline axes 822, 824 in a direction away from each other when the convertible mobile compute device 100 is positioned in the closed mode as shown in FIG. 8. That is, the lid hinge axis 812 is offset from the lid centerline axis 822 in a direction away from the base 104 and the base hinge axis 814 is offset from the base centerline axis 824 in a direction away from the top 102 when the convertible mobile compute device 100 is positioned in the closed mode. Conversely, the axes 812, 814 are offset relative to the corresponding centerline axes 822, 824 in a direction toward each other when the convertible mobile compute device 100 is positioned in the tablet mode as shown in FIG. 9. That is, the lid hinge axis 812 is offset from the lid centerline axis 822 in a direction toward from the base 104 and the base hinge axis 814 is offset from the base centerline axis 824 in a direction toward from the top 102 when the convertible mobile compute device 100 is positioned in the tablet mode.

Illustratively, the distances 830, 832 of offset of the axes 812, 814 from the centerline axes 822, 824 is equal. For example, in the illustrative embodiment, the lid hinge axis 812 is offset from the lid centerline axis 822 by about 0.075 millimeters, and the base hinge axis 814 is offset form the base centerline axis 824 by about 0.075 millimeters. Of course, in other embodiments, offset distances 830, 832 may be of a different value depending on various criteria such as the design and/or thickness of the lid 102 and/or base 104. Additionally, in some embodiments, the axes 812, 814 may be offset from the corresponding centerline axes 822, 824 by different distances.

It should be appreciated that because the lid hinge axis 812 is offset from the lid centerline axis 822 and the base hinge axis 814 is offset from the base centerline axis 824, the lid-to-base gap or distance 840 between the lid 102 and base 104 when the convertible mobile compute device 100 is positioned in the closed mode (FIG. 8) is smaller than the gap or distance 840 between the lid 102 and base 104 when the convertible mobile compute device 100 is positioned in the tablet mode (FIG. 9). For example, in the illustrative embodiment, the lid-to-base gap 840 is about 0.5 millimeters when the convertible mobile compute device 100 is positioned in the closed mode (FIG. 8) and about 0.8 millimeters when the convertible mobile compute device 100 is positioned in the tablet mode (FIG. 9). As such, by offsetting the hinge axes 812, 814, the lid-to-base gap 840 can be reduced when in the closed mode, which reduces the overall thickness of the convertible mobile compute device 100 when in the closed mode. In particular, because the hinge axes 812, 814 are farther from each other than the centerline axes 822, 824, the lid-to-base gap 840 is reduced when in the closed mode of FIG. 8

However, to ensure proper thermal performance of the convertible mobile compute device 100 a minimum base gap (i.e., a distance between the bottom of the base and any opposing structure) should be maintained. That base gap is typically defined by the feet 850 of the base 106. For example, when the convertible mobile compute device 100 is in set on a table, the feet 850 ensure a proper base gap between the table surface and the base 106 for proper thermal dissipation. As such, the lid-to-base gap 840 must be at least as large as the height of the feet 850 when in the tablet mode as shown in FIG. 9. As discussed in more detail below, such a requirement restricts or limits the lid-to-base gap, in any physical configuration mode, to the height of the feet 850. However, in the illustrative convertible mobile compute device 100, the offset of the hinge axes 812, 814 from the corresponding centerline axes 822, 824 allows for an increased lid-to-base gap 840 when the convertible mobile compute device 100 is positioned in the tablet mode (FIG. 9) relative to the closed mode (FIG. 8).

Figure 10:
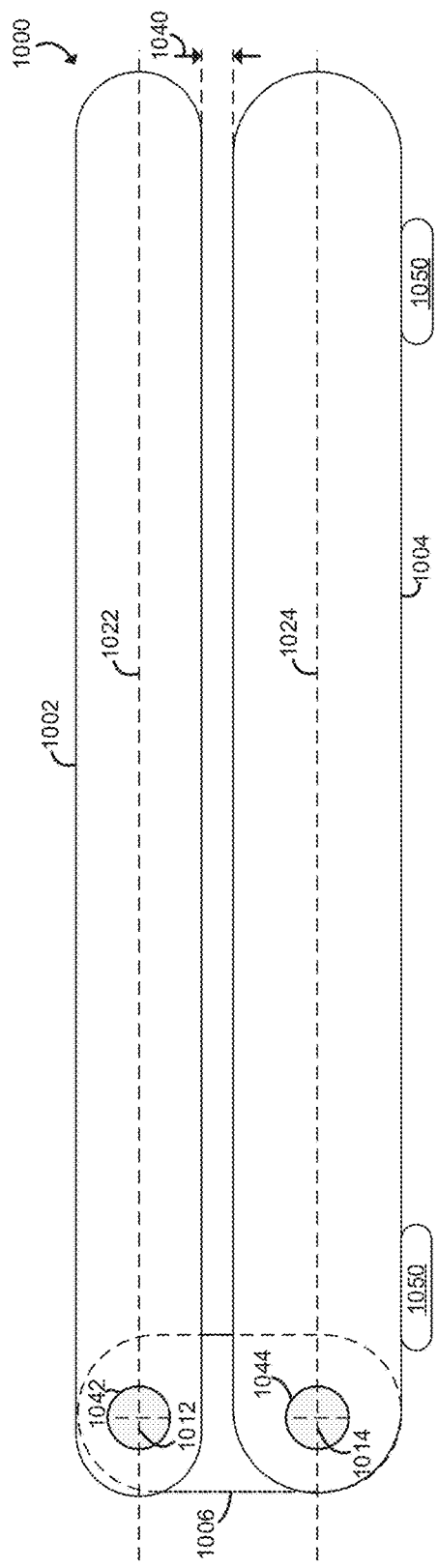
FIG. 10 is a simplified side elevation illustration of a prior art convertible mobile compute device positioned in a closed position.
Figure 11:
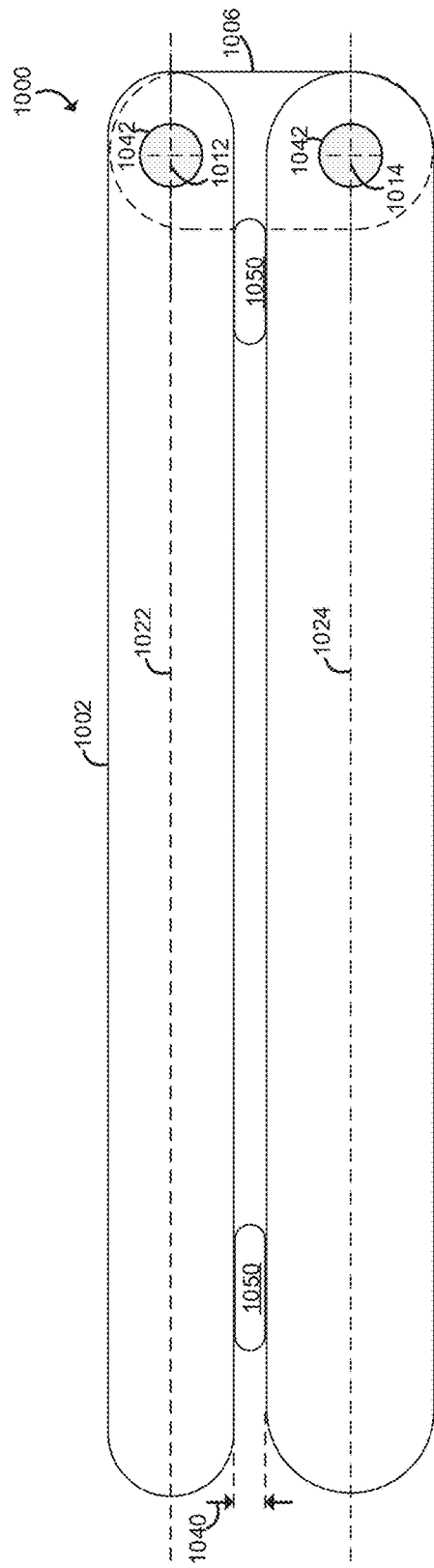
FIG. 11 is a simplified side elevation illustration of the prior art convertible mobile compute device of FIG. 10 positioned in a tablet position.

Conversely, as shown in FIGS. 10 and 11, the lid-to-base gap 1040 of a typical convertible mobile compute device 1000 is the same or otherwise equal when the typical convertible mobile compute device 1000 is positioned in either the closed mode (FIG. 10) or the tablet mode (FIG. 11). This is due because the lid hinge axis 1012 defined by the lid shaft 1042 of the hinge assembly 1006 of the typical convertible mobile compute device 1000 is located on the lid centerline axis 1022 defined by the lid 1002 of the typical convertible mobile compute device 1000. Similarly, the base hinge axis 1014 defined by the base shaft 1042 of the hinge assembly 1006 of the typical convertible mobile compute device 1000 is located on the base centerline axis 1024 defined by the base 1004 of the typical convertible mobile compute device 1000. That is, the hinge axes 1012, 1014 are not offset relative to the corresponding centerline axes 1022, 1024. Because the hinge axes 1012, 1014 are not offset relative to the corresponding centerline axes 1022, 1024, the lid-to-base gap 1040 is the same in both the closed mode and the tablet mode. Additionally, because a minimum base gap must be maintained and that base gap is defined by the feet 1050 of the typical convertible mobile compute device 1000, the height of the feet 1050 define the distance of the lid-to-base gap 1040, even when the typical convertible mobile compute device 1000 is positioned in the closed mode as shown in FIG. 10. As such, because the hinge axes 1012, 1014 are not offset relative to the corresponding centerline axes 1022, 1024, the overall thickness of the typical convertible mobile compute device 1000 is increased relative to the illustrative designs disclosed herein.

Figure 12:
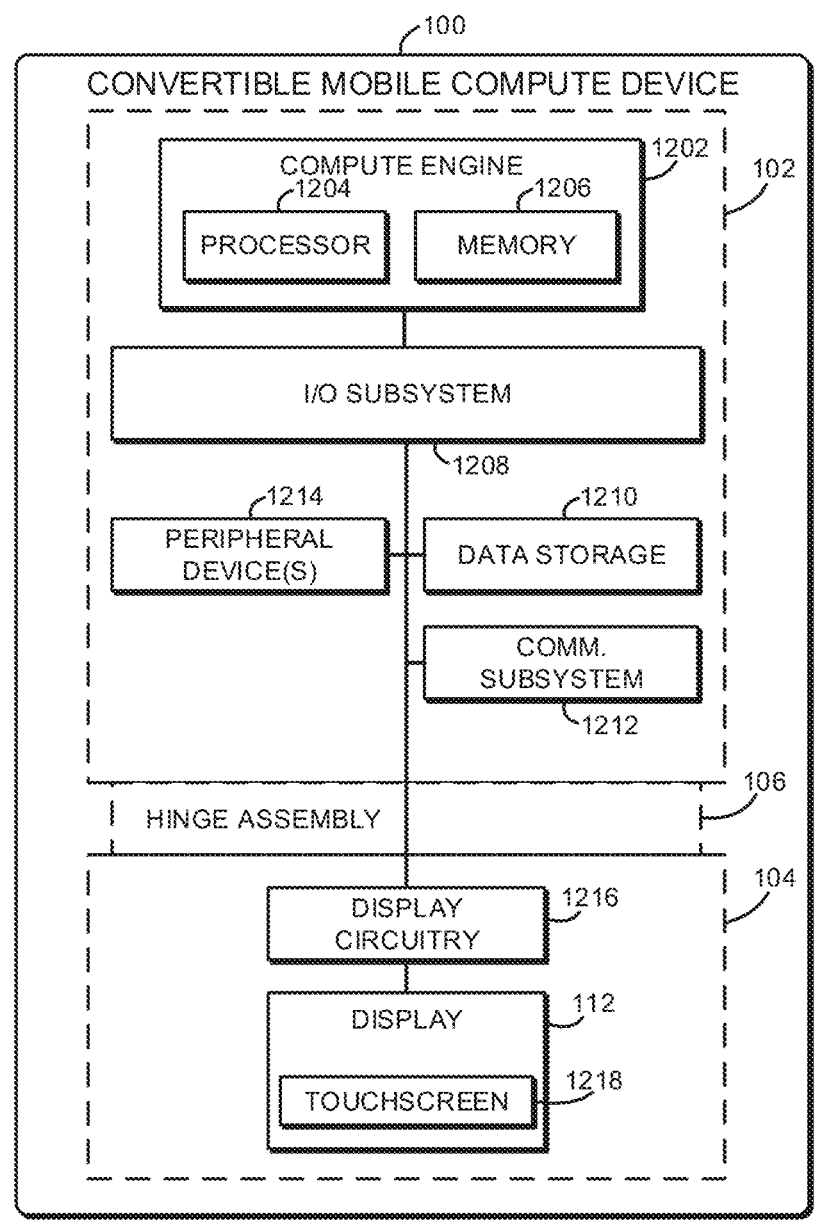
FIG. 12 is a simplified block diagram of at least one embodiment of the convertible mobile compute device of FIG. 1.

As shown in FIG. 12, the convertible mobile compute device 100 illustratively includes a compute engine 1202, an input/output (I/O) subsystem 1208, a data storage 1210, a communication subsystem 1212, peripheral device(s) 1214, display circuitry 1216, and the display 112. Illustratively, the compute engine 1202, the input/output (I/O) subsystem 1208, the data storage 1210, the communication subsystem 1212, and the optional peripheral device(s) 1214 are located in the base 102, while the display circuitry 1216 and display 112 are located in the lid 104. Of course, in other embodiments, various components of the convertible mobile compute device 100 may be located in the lid 104 or base 102. Additionally, in some embodiments, several of the foregoing components may be incorporated on a motherboard of the convertible mobile compute device 100, while other components may be communicatively coupled to the motherboard via, for example, a peripheral port. Furthermore, it should be appreciated that the convertible mobile compute device 100 may include other and/or additional components, such as those commonly found in a computer and/or computing device in other embodiments. Additionally, in some embodiments, one or more of the illustrative components may be incorporated in, or otherwise form a portion of, another component. For example, the memory 108, or portions thereof, may be incorporated in the processor 104 in some embodiments.

The compute engine 1202 may be embodied as any type of device or collection of devices capable of performing the various compute functions as described herein. In some embodiments, the compute engine 1202 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1202 may include, or may be embodied as, one or more processors 1204 (i.e., one or more central processing units (CPUs)) and memory 1206.

The processor(s) 1204 may be embodied as any type of processor(s) capable of performing the functions described herein. For example, the processor(s) 1204 may be embodied as one or more single-core processors, multi-core processors, digital signal processors (DSPs), microcontrollers, or other processor(s) or processing/controlling circuit(s). In some embodiments, the processor(s) 1204 may be embodied as, include, or otherwise be coupled to an FPGA, an ASIC, reconfigurable hardware or hardware circuitry, or other specialized hardware to facilitate performance of the functions described herein.

The memory 1206 may be embodied as any type of volatile or non-volatile memory or data storage capable of performing the functions described herein. It should be appreciated that the memory 1206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 1202 is communicatively coupled to other components of the convertible mobile compute device 100 via the I/O subsystem 1208, which may be embodied as circuitry and/or components to facilitate input/output operations with the processor 1204, the memory 1206, and other components of the convertible mobile compute device 100. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1208 may form a portion of a SoC and be incorporated, along with one or more of the processor 1204, the memory 1206, and other components of the convertible mobile compute device 100, on a single integrated circuit chip.

The data storage 1210 may be embodied as any type of storage device(s) configured for short-term or long-term storage of data, such as, for example, memory devices and circuits, memory cards, hard disk drives, solid-state drives, or other data storage devices. Each data storage device 1210 may include a system partition that stores data and firmware code for the data storage device 1210. Each data storage device 1210 may also include an operating system partition that stores data files and executables for an operating system.

The communication circuitry 1212 may be embodied as any communication circuit, device, or collection thereof, capable of enabling communications between the convertible mobile compute device 100 and other computing devices, as well as any network communication enabling devices, such as an access point, network switch/router, etc., to allow communication over a corresponding network. Accordingly, the communication circuitry 1212 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The peripheral devices 1214 of the convertible mobile compute device 100 may include any number of peripheral or interface devices. For example, the peripheral devices 1214 may include a display, a keyboard, a mouse, one or more data storage devices such as an internal or external hard drive, and/or other peripheral devices. The particular devices included in the peripheral devices 1214 may depend upon, for example, the intended use of the convertible mobile compute device 100. The peripheral devices 1214 are communicatively coupled to the I/O subsystem 1208 via a number of signal paths thereby allowing the I/O subsystem 1208 and/or processor 1204 to receive inputs from and send outputs to the peripheral devices 1214.

The display circuitry 1216 may be embodied as any type of circuitry and/or electronic devices for powering the display 112 and managing the display of information on the display 112. The display circuitry 1216 may be embodied as, for example, a graphical processing unit (GPU), video card, or other circuitry capable of controlling the display 112 to display information thereon.

As discussed above, the display 112 of the convertible mobile compute device 100 may be embodied as any type of display capable of displaying digital information such as a liquid crystal display (LCD), a light emitting diode (LED), a plasma display, a cathode ray tube (CRT), or other type of display device. In some embodiments, the display 112 may include, or otherwise be coupled to, a touchscreen 1218 to allow the user to interact with the convertible mobile compute device 100 by touching the display 112 in lieu of, or in addition to, the keyboard 110 or a peripheral device 1214 (e.g., a mouse).

Examples

Illustrative examples of the technologies disclosed herein are provided below. An embodiment of the technologies may include any one or more, and any combination of, the examples described below.

Example 1 includes a convertible mobile compute device comprising a lid having a display mounted therein, wherein the lid defines a lid centerline axis; a base having a keyboard mounted therein, wherein the base defines a base centerline axis; and a hinge assembly coupled to the lid and to the base to facilitate movement of the lid relative to the base, wherein the hinge assembly comprises a lid hinge bracket coupled to the lid and configured to rotate about a lid hinge axis and base hinge bracket coupled to the base and configured to rotate about a base hinge axis, wherein the lid hinge axis is offset from the lid centerline axis of the lid and the base hinge axis is offset from the base centerline axis of the base.

Example 2 includes the subject matter of Example 1, and wherein the lid is moveable relative to the base to position the convertible mobile compute device into a closed physical configuration mode and a tablet physical configuration mode, and wherein the lid hinge axis is offset from the lid centerline axis of the lid and the base hinge axis is offset from the base centerline axis of the base in a direction away from each other when the convertible mobile compute device is in the closed physical configuration mode.

Example 3 includes the subject matter of any of Examples 1 and 2, and wherein the lid hinge axis is offset from the lid centerline axis of the lid and the base hinge axis is offset from the base centerline axis of the base in a direction away toward each other when the convertible mobile compute device is in the tablet physical configuration mode.

Example 4 includes the subject matter of any of Examples 1-3, and wherein the lid is moveable relative to the base to position the convertible mobile compute device into a closed physical configuration mode and a tablet configuration mode, and wherein (i) the lid hinge axis is offset from the lid centerline axis of the lid in a direction away from the base when the convertible mobile compute device is positioned in the closed physical configuration mode and (ii) the base hinge axis is offset from the base centerline axis of the base in a direction away from the lid when the convertible mobile compute device is positioned in the closed physical configuration mode.

Example 5 includes the subject matter of any of Examples 1-4, and wherein (i) the lid hinge axis is offset from the lid centerline axis of the lid in a direction toward from the base when the convertible mobile compute device is positioned in the tablet physical configuration mode and (ii) the base hinge axis is offset from the base centerline axis of the base in a direction toward the lid when the convertible mobile compute device is positioned in the tablet physical configuration mode.

Example 6 includes the subject matter of any of Examples 1-5, and wherein the lid hinge axis is offset from the lid centerline axis of the lid by a first distance and the base hinge axis is offset from the base centerline axis of the base by a second distance equal to the first distance.

Example 7 includes the subject matter of any of Examples 1-6, and wherein the first and second distances are equal to 0.075 millimeters.

Example 8 includes the subject matter of any of Examples 1-7, and wherein the lid is moveable relative to the base to position the convertible mobile compute device into a closed physical configuration mode and a tablet configuration mode, and wherein the lid and base defined a lid-to-base gap therebetween and wherein the lid-to-base gap has a first height when the convertible mobile compute device is positioned in the closed physical configuration mode and a second height when the convertible mobile compute device is positioned in the tablet physical configuration mode that is different from the first height.

Example 9 includes the subject matter of any of Examples 1-8, and wherein the second height is greater that the first height.

Example 10 includes the subject matter of any of Examples 1-9, and wherein the first height is about 0.5 millimeters and the second height is about 0.8 millimeters.

Example 11 includes the subject matter of any of Examples 1-10, and wherein the base comprises a plurality of feet attached to a bottom side of the base and wherein a height of the feet define the second height.

Example 12 includes the subject matter of any of Examples 1-11, and wherein the lid is moveable relative to the base to position the convertible mobile compute device into a closed physical configuration mode and a tablet configuration mode, and wherein a first distance defined between the lid hinge axis and the base hinge axis when the convertible mobile compute device is in the closed physical configuration mode is different from a second distance defined between the lid hinge axis and the base hinge axis when the convertible mobile compute device is in the closed physical configuration mode.

Example 13 includes the subject matter of any of Examples 1-12, and wherein the hinge assembly comprises a housing, a lid shaft extending from the housing, and a base shaft extending from the housing, wherein the lid shaft defines the lid hinge axis and the base shaft defines the base hinge axis.

Example 14 includes the subject matter of any of Examples 1-13, and wherein the lid hinge comprises a shaft tube in which the lid shaft is received and the base hinge comprises a shaft tube in which the base shaft is received, wherein the lid hinge is to rotate about the lid shaft and the base hinge is to rotate about the base shaft.

Example 15 includes a convertible mobile compute device comprising a hinge assembly comprising a lid hinge bracket coupled to a lid of the convertible mobile compute device and a base hinge bracket coupled to a base of the convertible mobile compute device to allow movement of the lid relative to the base, wherein (i) the lid hinge bracket rotates about a lid hinge axis and (ii) the base hinge bracket rotates about a base hinge axis when the lid is moved relative to the base, wherein a distance defined between the lid hinge axis and the base hinge axis changes when lid is moved relative to the base.

Example 16 includes the subject matter of Example 15, and wherein the lid is moveable relative to the base to position the convertible mobile compute device into a closed physical configuration mode and a tablet physical configuration mode, and wherein the lid hinge axis is offset from a lid centerline axis defined by the lid and the base hinge axis is offset from a base centerline axis defined by the base in a direction away from each other when the convertible mobile compute device is in the closed physical configuration mode.

Example 17 includes the subject matter of any of Examples 15 and 16, and wherein the lid hinge axis is offset from the lid centerline axis of the lid and the base hinge axis is offset from the base centerline axis of the base in a direction away toward each other when the convertible mobile compute device is in the tablet physical configuration mode.

Example 18 includes the subject matter of any of Examples 15-17, and wherein the lid is moveable relative to the base to position the convertible mobile compute device into a closed physical configuration mode and a tablet configuration mode, and wherein (i) the lid hinge axis is offset from a lid centerline axis defined by the lid in a direction away from the base when the convertible mobile compute device is positioned in the closed physical configuration mode and (ii) the base hinge axis is offset from a base centerline axis defined by the base in a direction away from the lid when the convertible mobile compute device is positioned in the closed physical configuration mode.

Example 19 includes the subject matter of any of Examples 15-18, and wherein (i) the lid hinge axis is offset from the lid centerline axis of the lid in a direction toward from the base when the convertible mobile compute device is positioned in the tablet physical configuration mode and (ii) the base hinge axis is offset from the base centerline axis of the base in a direction toward the lid when the convertible mobile compute device is positioned in the tablet physical configuration mode.

Example 20 includes the subject matter of any of Examples 15-19, and wherein the lid hinge axis is offset from a lid centerline axis defined the lid by a first distance and the base hinge axis is offset from a base centerline axis defined by the base by a second distance equal to the first distance.

Example 21 includes the subject matter of any of Examples 15-20, and wherein the first and second distances are equal to 0.075 millimeters.

Example 22 includes the subject matter of any of Examples 15-21, and wherein the lid is moveable relative to the base to position the convertible mobile compute device into a closed physical configuration mode and a tablet configuration mode, and wherein the lid and base defined a lid-to-base gap therebetween and wherein the lid-to-base gap has a first height when the convertible mobile compute device is positioned in the closed physical configuration mode and a second height when the convertible mobile compute device is positioned in the tablet physical configuration mode that is different from the first height.

Example 23 includes the subject matter of any of Examples 15-22, and wherein the second height is greater that the first height.

Example 24 includes the subject matter of any of Examples 15-23, and wherein the first height is about 0.5 millimeters and the second height is about 0.8 millimeters.

Example 25 includes the subject matter of any of Examples 15-24, and wherein the second height is defined by a height of a plurality of feet attached to the base of the convertible mobile compute device.

The invention claimed is:

1. A convertible device comprising:
a lid defining a lid plane that extends through the lid and is equidistant between a top side of the lid and a bottom side of the lid;
a base defining a base plane that extends through the base and is equidistant between a top side of the base and a bottom side of the base; and
a hinge assembly coupled between the lid and the base to enable the lid and the base to change between a closed configuration and a tablet configuration, the hinge assembly including:
a lid shaft defining a lid hinge axis, the lid hinge axis offset relative to the lid plane in a direction away from the base plane when the lid and the base are in the closed configuration; and
a base shaft defining a base hinge axis, the base hinge axis offset relative to the base plane in a direction away from the lid plane when the lid and the base are in the closed configuration.

2. The convertible device of claim 1, wherein the lid hinge axis is offset relative to the lid plane in a direction toward the base plane when the lid and the base are in the tablet configuration, and the base hinge axis is offset relative to the base plane in a direction toward the lid plane when the lid and the base are in the tablet configuration.

3. The convertible device of claim 1, wherein the lid includes a display on the bottom side.

4. The convertible device of claim 1, wherein the lid and the base are separated by a gap, the gap having a first distance when the lid and the base are in the closed configuration, and the gap having a second distance when the lid and the base are in the tablet configuration, the first distance different than the second distance.

5. The convertible device of claim 4, wherein the first distance is less than the second distance.

6. The convertible device of claim 4, further including a foot on the bottom side of the base, the second distance defined by a height of the foot.

7. The convertible device of claim 4, wherein the lid, the base, and the first distance define a first thickness of the convertible device when the lid and the base are in the closed configuration, and the lid, the base, and the second distance define a second thickness of the convertible device the lid and the base are in the tablet configuration, the second thickness different than the first thickness.

8. The convertible device of claim 7, wherein the second thickness is greater than the first thickness.

9. The convertible device of claim 1, wherein the lid hinge axis is offset relative to the lid plane by a first distance, and the base hinge axis is offset relative to the base plane by a second distance, the second distance equal to the first distance.

10. A convertible device comprising:
a lid defining a lid plane that extends through the lid and is equidistant between a top side of the lid and a bottom side of the lid, the lid including a display on the bottom side of the lid;
a base defining a base plane that extends through the base and is equidistant between a top side of the base and a bottom side of the base, the base including a keyboard on the top side of the base; and
a hinge assembly coupled to the lid and the base to enable the lid and the base to change between a closed mode and a tablet mode, the hinge assembly including:
a lid bracket coupled to the lid, the lid bracket rotatable about a lid hinge axis, the lid hinge axis being between the top side of the lid and the lid plane; and
a base bracket coupled to the base, the base bracket rotatable about a base hinge axis, the base hinge axis being between the bottom side of the base and the base plane.

11. The convertible device of claim 10, wherein the hinge assembly includes:
a housing;
a lid shaft extending from the housing, the lid shaft defining the lid hinge axis; and
a base shaft extending from the housing, the base shaft defining the base hinge axis.

12. The convertible device of claim 11, wherein the lid bracket is rotatable about the lid shaft and the base bracket is rotatable about the base shaft.

13. The convertible device of claim 12, wherein the lid bracket includes a lid mounting plate and a lid mounting shaft tube, the lid mounting plate coupled to the lid, the lid shaft received within the lid mounting shaft tube, and wherein the base bracket includes a base mounting plate and a base mounting shaft tube, the base mounting plate coupled to the base, the base shaft received within the base mounting shaft tube.

14. The convertible device of claim 10, wherein the lid hinge axis is offset from the lid plane by a first distance and the base hinge axis is offset from the base plane by a second distance, the second distance equal to the first distance.

15. The convertible device of claim 10, wherein the lid and the base are separated by a gap, the gap having a first distance when the lid and the base are in the closed mode, the gap having a second distance when the lid and the base are in the tablet mode, the first distance different than the second distance.

16. The convertible device of claim 15, wherein the second distance is greater than the first distance.

17. A convertible device comprising:
a lid;
means for displaying coupled to the lid;
a base; and
means for movably coupling the lid and the base to facilitate movement between a closed configuration where a lid-to-base gap between the lid and the base is a first distance and a tablet configuration where the lid-to-base gap between the lid and the base is a second distance, the second distance greater than the first distance,
wherein the lid defines a lid plane which extends through the lid and is equidistant between a top side of the lid and a bottom side of the lid, and the base defines a base plane which extends through the base and is equidistant between a top side of the base and a bottom side of the base, and
wherein the means for movably coupling the lid and the base defines a lid hinge axis that is offset from a lid plane in a direction away from the base when the lid and the base are in the closed configuration, and wherein the means for movably coupling the lid and the base defines a base hinge axis that is offset from a base plane in a direction away from the lid when the lid and the base are in the closed configuration.

18. The convertible device of claim 17, wherein the lid and the base have a first thickness between a bottom side of the base and a top side of the lid in the closed configuration, and the lid and the base have a second thickness between a top side of the base and a bottom side of the lid in the tablet configuration, the second thickness greater than the first thickness.

* * * * *